United States Patent Office 2,936,294
Patented May 10, 1960

2,936,294

PREPARATION OF CELLULAR POLYAMIDE-EPOXY RESIN COMPOSITIONS

Robert C. Kohrn, Pawtucket, R.I., assignor to United States Rubber Company, New York, N.Y., a corporation of New Jersey No Drawing. Application September 27, 1957
Serial No. 686,596

3 Claims. (Cl. 260—2.5)

This invention relates to an improved blown or expanded resinous material of unusual properties, and to a method of making such material. More particularly, the invention relates to a method of making an improved porous plastic material from a polyamide resin by (1) treating the polyamide resin with N,N'-dinitroso N,N'-dimethyl terephthalamide, which treatment causes bubbles of nitrogen gas to be generated and consequently forms pores in the polyamide, and (2) simultaneously chemically reacting the polyamide with an epoxy resin, which acts as a curing agent for the polyamide and therefore fixes the pores in the mass.

The polyamide-epoxy resin mixture forming the basis of the present invention is a known system. Thus, for example, in the article entitled "Alloying with Epoxides," by John Charlton, appearing in Modern Plastics for September 1954, at page 155, there are described resin systems in which polyamide resins and epoxy resins are interacted with each other to form a cured product. Similarly, in U.S. Patent 2,707,708, issued to Wittcoff on May 3, 1955, mixtures of polyamide resins and epoxy resins which react to produce insoluble, infusible materials are referred to. Also, in U.S. Patent 2,698,315, Greenlee, December 28, 1954, the mutual cross-linking interaction of polyamides and epoxy resins is described. Such prior teachings are hereby incorporated in the present disclosure by reference, as representative of the epoxides and polyamides employed in the present invention, and as showing methods of making the starting materials used in the invention.

Preferred polyamide resins suitable for use in the invention may be prepared by the condensation of polymerized unsaturated fatty acids (e.g. dilinoleic acid) with aliphatic amines. Methods of effecting such condensation are described, for example, in U.S. Patents 2,450,940, Cowan et al., October 12, 1948, and 2,705,223, Renfrew et al., March 29, 1955, incorporated herein by reference. Such polyamides may be described as reaction products of polymeric fatty acids containing at least 2 carboxyl groups and an aliphatic polyamine (e.g. ethylene diamine). The resulting polyamide is characterized by the presence of free amine groups or free carboxyl groups. In accordance with a particularly advantageous aspect of the invention, the lowest melting forms of such polyamides are employed, i.e. those which are fluid or nearly fluid at room temperature, or fluid at only slightly elevated temperature, thereby greatly facilitating the operational steps of the invention. Preferred polyamides may be described as those melting at about 60° C. or less, and more preferably at about 45° C. or less. The commercially available polyamides sold under the trade designation "Polyamide Resin 100" and "Polyamide Resin 115," by General Mills, Inc., as described in their technical bulletin 11-1-2, published in 1954, are examples of suitable materials.

With regard to the epoxy resin, this ingredient is also a known material requiring no detailed description here. Reference may be had to the above-mentioned patents of Greenlee, Renfrew et al., or Wittcoff, for a complete description of typical epoxy resins employed in the invention. They are commonly complex polymeric reaction products of polyhydric alcohols with polyfunctional halohydrins such as epichlorhydrin and glycerol dichlorohydrin. The products obtained may contain terminal epoxy groups, or terminal epoxy groups and terminal primary hydroxyl groups. Typical phenols employed include resorcinol, and various bisphenols (see, for example, U.S. Patent 2,585,115 of Greenlee, February 12, 1952). Such epoxy resins are commercially available under such trade designations as "Bakelite C-8 Epoxy Resin" (Bakelite Co.), "Araldite CN" (Ciba Co.), "Epon" (Shell Chemical Corp.), and "Hysol" (Houghton Laboratories, Inc.).

The present invention is based on the unexpected discovery that the polyamide resin will react with N,N'-dinitroso N,N'-dimethyl terephthalamide, to yield quantities of free nitrogen gas, causing the polyamide to foam up into a porous structure of greatly increased volume. While in this blown-up state the polyamide is fixed or cured by the action of the epoxide resin, thereby making a permanent spongy or cellular structure. N,N'-dinitroso N,N'-dimethyl terephthalamide is a commercially available material ("BL-353," du Pont Co.) having the structure

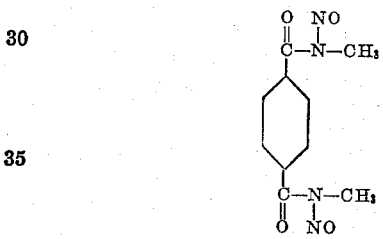

It should be handled with care as it is easily ignited and burns rapidly, and it is a weak explosive, although as marketed it usually contains a diluent such as mineral oil which acts as a desensitizer. It should be used in a well ventilated area as it may evolve toxic materials.

A particularly advantageous aspect of the present invention resides in the fact that the interaction between the polyamide resin and the N,N'-dinitroso N,N'-dimethyl terephthalamide, with evolution of gas, takes place readily at ordinary room temperatures, and therefore the blown or expanded material can be made without the aid of any externally applied heat if desired. This makes it possible to carry out the process easily and conveniently with a minimum of equipment and regulation in almost any location. This convenience is enhanced by the fact that the reaction mixture is readily available in liquid form, since the polyamide resins used are either inherently liquids in themselves, or readily soluble in suitable liquid plasticizers or other appropriate solvents. To the liquid polyamide the N,N'-dinitroso N,N'-dimethyl terephthalamide and epoxy resin are added to make a self-foaming and self-curing liquid which needs only to be poured into a suitable container or space, and soon sets up to form the permanently porous solid body. If desired the ingredients may be mixed in situ directly in the container where the blowing and curing are to take place. All three essential ingredients, viz., the polyamide, the N,N'-dinitroso N,N'-dimethyl tetrephthalamide, and the epoxy resin, may be mixed simultaneously or in any desired order, it being understood that the N,N'-dinitroso N,N'-dimethyl terephthalamide must be added before the epoxy resin has a chance to cross-link the polyamide to a rigid state, and also the epoxy resin must be added before the gas generated by the N,N'-dinitroso N,N'-dimethyl terephthalamide has a chance to be dissipated from the mix. The curing action of the epoxy resin on the polyamide also takes place readily at room temperature, so the whole operation may be completed without any heating at all, if desired. However, in some instances it may be desirable to at least complete the cure by moderate heating to a temperature of for example, about 100° to 150° F. (and even higher temperatures, such as about 300° F., may be applied if desired) but this is generally unnecessary.

As far as proportions are concerned, these are not critical, and I may use, for example, as little as 5 parts of epoxy resin to 95 parts of polyamide resin, or, conversely, as little as 5 parts of polyamide resin to 95 parts of epoxy resin. The higher the proportion of epoxy resin, the more rigid the product. By varying the proportions, I make rigid, semi-rigid, and flexible sponge products. Neither is the proportion of N,N'-dinitroso N,N'-dimethyl terephthalamide in the mixture critical, since it may be varied as desired, the only effect of larger or smaller amounts being to generate greater or lesser quantities of gas, with consequent correspondingly increased or decreased relative porosity.

The N,N'-dinitroso N,N'-dimethyl terephthalamide does not appear to react with the epoxy resin, and therefore I frequently find it most convenient to premix the N,N'-dinitroso N,N'-dimethyl terephthalamide with the epoxy resin composition to form a masterbatch which may be added to the polyamide when desired. For this purpose the epoxy resin is frequently conveniently first dissolved in a suitable solvent or plasticizer. Several minutes after mixing the liquid masterbatch with the polyamide resin, gassing will commence, and the material will expand and cure. If desired, solid epoxy resin may be added directly to the polyamide (prior to, simultaneously with, or subsequent to the N,N'-dinitroso N,N'-dimethyl terephthalamide). If the polyamide is a solid at room temperature it may be dissolved in a suitable plasticizer or solvent (or dissolved in a solution of the epoxy resin), or moderate heat may be employed to melt the polyamide resin at the start of the process. In any event, the reaction mixture will be in a liquid state at the time of the blowing and curing.

The expandable, curable composition may further include any additional desired appropriate compounding or modifying ingredients such as fillers, pigments or other coloring matter, fibrous reinforcement such as flock or glass fibers, or suitable plasticizers, microballons etc. These may be added at any suitable stage. The addition of aluminum powder frequently tends to decrease shrinkage, and tends to make the foam more rigid. Silica (Hi-Sil) tends to decrease the cell size and increase the firmness of the foam. Aniline improves the cell uniformity and improves the foaming action, yielding a lower density foam.

The method of the invention is particularly well adapted to the production of foamed in placed resinous bodies, by blowing or casting the self-flowing, self-curing liquid in any enclosed space, such as between the walls or panels of a building or other structure, or within cavities or open spaces inside airplanes or boat hulls. The foamed, cured material forms a low-density filler that has heat-insulating value and sound-deadening value, and adds structural strength, as well as buoyancy. Structural panels or similar units may be made by casting the mixture between walls made of sheet metal, such as aluminum, or made of plastic, such as glass-reinforced polyester resin. Similarly, the material may be cast in the spaces of a honeycomb type of supporting or spacing structure.

The non-rigid type of blown or foamed product of the invention is especially valuable for its energy-absorbing or cushioning effect, combined with low density and heat-insulating value. Crash pads, linings for helmets, jackets, footwear or other clothing, mattresses, and similar articles, can employ these properties to good advantage.

The method of the invention is readily adapted to continuous operation, since the pre-mixed liquid may be sprayed or poured into moving molds or onto a moving surface, such as a conveyor belt or moving table, where it is allowed to blow and cure and from which it is later stripped as a solid, porous body. The mixing of the materials may be accomplished just prior to entering the spraying or pouring device, or the materials may be sprayed or poured into a single stream from separate sources of supply. Applied to fabric, or to flexible or rigid plastic sheets, or to metal backings, in this or any similar manner, useful composite or laminated articles are obtained.

The product may be used for weatherstripping, windlace or gasketing, also for playing balls such as practice golf balls, or cores for baseballs. Many other uses will suggest themselves to those skilled in the art.

It is desired to reiterate that the ability of the present system to react in a liquid state at ordinary temperatures with the N,N'-dinitroso N,N'-dimethyl terephthalamide to evolve gas, without application of external heat, is a particularly unexpected and advantageous feature of the invention, that makes the process more economical and more convenient than known systems which require high temperatures to decompose a chemical blowing agent to generate the gas. It was particularly unexpected to find in the present instance that the polyamide would apparently in some way chemically interact with the N,N'-dinitroso N,N'-dimethyl terephthalamide to evolve the gas, and yet the polyamide would still remain susceptible of being cured by the epoxy resin. It was similarly unexpected to find that the epoxy resin would not interfere with the interaction of the polyamide and the N,N-dinitroso N,N'-dimethyl terephthalamide.

The following examples (in which all parts are expressed by weight) will serve to illustrate typical practice of the invention in more detail.

*Example I*

The following ingredients were stirred together:

Epoxy resin (Hysol 2050) _____ 75
N,N'-dinitroso N,N'-dimethyl terephthalamide (BL 353) _____ 10
                                                                                  ——
                                                                                   85

The Hysol 2050 (Houghton Laboratories, Inc.) was a commercial preparation containing about 68% of epoxy resin dissolved in a volatile organic solvent (toluene). The BL-353 (du Pont) was a commercial preparation containing 30% of white mineral oil. To the foregoing masterbatch there was then added a fluid polyamide resin in the following proportions:

Masterbatch _____ 85
Polyamide 115 _____ 25
                                                                                  ——
                                                                                  110

The polyamide 115 was a commercial resin obtained from General Mills, Inc.

After a few minutes the mixture began to foam, due to gas generated by the interaction of the polyamide and the N,N'-dinitroso N,N'-dimethyl terephthalamide, and after the mass attained many times its original volume it began to set hard due to the action of the epoxy resin. The final result was a rigid sponge of low density and good physical properties. The whole operation was carried out at room temperature. The product was essentially infusible and insoluble in common solvents. When cut open it revealed a uniform porous structure, in which a majority of the cells were interconnected.

Any of the polyamide resins or epoxy resins disclosed in the above mentioned patents could be substituted for the commercial materials used in this example, with equivalent results. Thus, in Cowan et al. 2,450,940 Examples 1 to 21 set forth specific polyamide resins, and in Renfrew et al. 2,705,223 Examples 1, 5 and 9 set forth further specific polyamide resins; while in Wittcoff 2,707,708 a specific epoxy resin ("Epon—Shell Chemical) is shown at lines 2-5 in column 4, and in Greenlee 2,698,315 (who also refers to "Epon" resin) further specific epoxy resins are shown in Examples 1 to 4, and it will be understood that each of these specific polyamides of Cowan et al. or Renfrew et al. may be mixed with each of these specific epoxy resins of Wittcoff or Greenlee, using the proportions and procedure described in the foregoing example. Further examples of formulations, based on commercially available materials, which may be processed in the foregoing manner, are as follows.

Example II

Rigid foam: Parts
(a) Versamide (polyamide) 115 _____ 50
(b) Epon 828 _____ 100
(c) BL-353 _____ 10

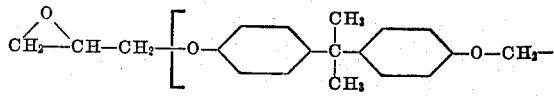

Example III

Flexible foam: Parts
(a) Versamide 115 _____ 75
(b) Epon 828 _____ 25
(c) BL-353 _____ 10

Example IV

Very soft foam: Parts
(a) Versamide 115 _____ 80
(b) Epon 828 _____ 20
(c) BL-353 _____ 10

Densities of 4 to 15 lbs./cu.ft. are typical. Other suitable commercial epoxy resins include Hysol 2050, Hysol 6055, Ciba 102, Ciba 504, and Bakelite ERL 2795.

The herein-mentioned commercially available polyamide resins (viz. General Mills' "Polyamide Resin 100," "Polyamide Resin 115" [also called "Versamides"], and epoxy resins [viz. Bakelite's "V-8" and "ERL 2795," Ciba's "Araldite CN," "102" and "504," Houghton's "Hysol 2050" and "6055" and Shell's "Epon 828"]) may be described chemically as indicated above and as disclosed in the patents referred to, that is, these polyamide resins are condensation products of dilinoleic acid or similar polymerized unsaturated fatty acids with ethylene diamine or similar aliphatic amines, such as are described in the Cowan et al. and Renfrew et al. patents, while the epoxy resins are complex polymeric reaction products of epichlorhydrin or the like with bisphenol or the like, such as are described in the Greenlee or Wittcoff patents (note that the latter uses the trade name "Epon," as do Renfrew et al.). In their technical bulletin 11-1-2, published in 1954, General Mills describe their "Polyamide" (also called "Versamide") series of resins in detail and state that they may be prepared by a typical condensation reaction employing ethylene diamine as follows:

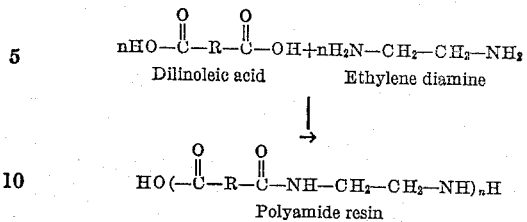

In the case of "Polyamide Resin 115" or "Versamide 115," the polymer is a viscous liquid having a color of 12 on the Gardner scale, an acid number of 12, an ash of 7% by weight and a specific gravity of 0.99. "Polyamide Resin 100" or "Versamide 100" is similar in chemical nature but is a soft, tacky resin, having a softening point of about 45° C. by reason of its higher molecular weight. In their technical publication SC:54-46 published in 1954 the Shell Chemical Co. gives the following structural formula for their "Epon" resins:

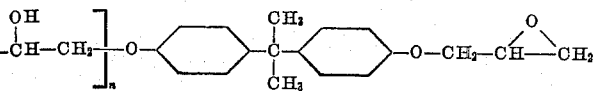

"Epon 828" is such a resin having an epoxide equivalent of 175-210, while "Epon 1001" (mentioned by Wittcoff) has an epoxide equivalent of 450-525. "Epon 828" is described in the technical bulletin referred to as a liquid having a color of 12 on the Gardner scale, a viscosity of 150 poises, weighing 10.27 pounds per gallon, having a refractive index at 20° C. of 1.573, an equivalent weight (i.e., grams of resin required to esterify completely one gram-mole of monobasic [acetic] acid) of 85 and a melting point of 8 to 12° C. The Ciba, Bakelite and Houghton epoxy resins also have this same chemical nature, differing only slightly in molecular weight, epoxide equivalent, or equivalent weight. Houghton supplies this epoxy resin as a 68% solution in toluene ("Hysol").

Having thus described my invention, what I claim and desire to protect by Letters Patent is:

1. A method of making a porous body comprising reacting (1) a polyamide resin having a melting point of not more than 60° C., which is a reaction product of a polymeric fatty acid containing at least two carboxyl groups and an aliphatic polyamine, and (2) N,N'-dinitroso N,N'-dimethyl telephthalamide, whereby gas is evolved in the said resin, and treating the said gas-containing polyamide resin with (3) an epoxy resin which is a reaction product of a polyhydric substance selected from the group consisting of resorcinol and bisphenol with a polyfunctional chlorhydrin selected from the group consisting of epichlorhydrin and glycerol dichlorohydrin, and which contains terminal epoxy groups, whereby the said polyamide resin becomes cured, the ratio of polyamide resin to epoxy resin being from 5:95 to 95:5.

2. A method as in claim 1, wherein said polyamide resin is a liquid at room temperature, and said method is carried out at room temperature.

3. A method as in claim 1, wherein the said ingredients (1), (2) and (3) are mixed in a liquid phase.

References Cited in the file of this patent
UNITED STATES PATENTS

| | | |
|---|---|---|
| 2,705,223 | Renfrew et al. | Mar. 29, 1955 |
| 2,707,708 | Wittcoff | May 3, 1955 |
| 2,739,134 | Parry et al. | Mar. 20, 1956 |